(12) United States Patent
Akins

(10) Patent No.: US 6,209,489 B1
(45) Date of Patent: Apr. 3, 2001

(54) SWING-OUT FEEDER

(76) Inventor: Edward A. Akins, P.O. Box 158, St. Boniface, Manitoba (CA), R2H 3B4

( * ) Notice: Subject to any disclaimer, the term of this patent is extended or adjusted under 35 U.S.C. 154(b) by 0 days.

(21) Appl. No.: 09/326,788

(22) Filed: Jun. 4, 1999

(51) Int. Cl.$^7$ .................................................. A01K 1/10
(52) U.S. Cl. ........................................ 119/61; 119/52.1
(58) Field of Search .................................. 119/51.01, 58, 119/60, 61, 63, 432, 428, 51.5, 52.1, 72, 74; A01K 1/10

(56) References Cited

U.S. PATENT DOCUMENTS

| | | | |
|---|---|---|---|
| 741,175 | * | 10/1903 | Shutts ..................................... 119/61 |
| 1,028,445 | * | 6/1912 | Dewey ..................................... 119/61 |
| 1,032,747 | * | 7/1912 | Evans ..................................... 119/522 |
| 1,216,203 | * | 2/1917 | Bower ..................................... 119/60 |
| 1,447,562 | * | 3/1923 | Mattson et al. .......................... 119/63 |
| 1,790,385 | * | 1/1931 | Lorcher .................................. 119/61 |
| 2,643,637 | * | 6/1953 | Lewis ..................................... 119/437 |
| 2,713,321 | * | 7/1955 | Keen ....................................... 119/672 |
| 2,798,457 | * | 7/1957 | Seward ............................... 119/51.01 |
| 3,017,858 | * | 1/1962 | Brown ................................... 119/428 |
| 3,099,981 | * | 8/1963 | Carpenter ............................... 119/61 |
| 3,185,133 | * | 5/1965 | Bird ....................................... 119/477 |
| 4,505,227 | * | 3/1985 | Hartke et al. .......................... 119/52.1 |
| 5,000,122 | * | 3/1991 | Smith ..................................... 119/58 |
| 5,421,290 | * | 6/1995 | Welch ................................. 119/51.11 |
| 5,909,717 | * | 6/1999 | Randall ................................... 119/58 |

FOREIGN PATENT DOCUMENTS

| | | | |
|---|---|---|---|
| 632852 | * | 12/1961 | (CA) ..................................... 119/61 |
| 640606 | * | 12/1936 | (DE) ..................................... 119/61 |
| 613770 | * | 11/1926 | (FR) ..................................... 119/61 |
| 585838 | * | 2/1947 | (GB) ..................................... 119/61 |
| 839388 | * | 6/1960 | (GB) ..................................... 119/61 |
| 85966 | * | 3/1936 | (SE) ..................................... 119/61 |

* cited by examiner

Primary Examiner—Michael J. Carone
Assistant Examiner—Son T. Nguyen
(74) Attorney, Agent, or Firm—Charles G. Lamb; Middleton Reutlinger

(57) ABSTRACT

A swing-out animal feeder is disclosed comprising a feed container having a filling aperture in a top portion thereof for filling with feed and having a feeding aperture in a lower portion thereof for allowing an animal to feed therefrom. The feed container is pivotally mounted in an animal barrier such that it may pivot from a feeding position wherein the feeding aperture is positioned for the animal to feed from one side of the barrier, to a filling position wherein the filling aperture is positioned for filling with feed from a second side of the barrier. A lid is provided which is automatically removed when the feed container is moved to the filling position, and a substantially inverted cleaning position is also provided.

31 Claims, 5 Drawing Sheets

SWING-OUT FEEDER

This invention is in the field of equipment for feeding animals and in particular a device for feeding animals confined on one side of a barrier from the opposite side thereof.

BACKGROUND

Animals are most often confined behind a pen wall, fence or similar confining barrier. It is desirable to be able to provide feed from the opposite side of the pen wall so that the person feeding does not have to enter the pen, thereby disturbing the animals and providing opportunities for escape, possible injury to the person or animals, and so forth.

Feeders for attachment to a pen wall, fence or other barrier are known wherein the feed is put in at the top from the outside of the barrier and is accessible to the animals on the inside thereof. "Lazy Susan" type feeders are also known wherein the feeder pivots on a vertical axis in a barrier wall so that the top may be pivoted so as to be more easily accessible from the outside of the barrier for filling.

The prior art feeders generally require that feed be raised to a height that is over the average person's head for filling, resulting in spillage and discomfort for the person filling the feeder.

It is desirable to provide a lid over the feeder to prevent the animal from reaching over the top of the feeder for feed instead of feeding from the feed aperture, thereby drawing out big pieces of hay which drop to the floor and are wasted. The lid also prevents entry of rain, birds and other foreign material. Prior art feeders either do not have such lids, or require that the lids be removed and set aside in order to fill the feeder.

Feeders must be cleaned periodically, usually requiring their removal from the barrier so that they may be inverted to dump out the cleaning water and so forth as well as left over feed.

A feeder that allowed for convenient filling and the proper feeding height for all animals would be beneficial. Such a feeder that had a more convenient lid and was easily cleaned would be further beneficial.

SUMMARY OF THE INVENTION

It is the object of the present invention to provide an animal feeder that pivots from a feeding position to a filling position, thereby providing both a convenient feeding position for the animal and a convenient filling position for filling it with feed.

It is a further object of the present invention to provide such an animal feeder that has a convenient lid and that is conveniently inverted for cleaning.

The invention accomplishes its objects providing in one aspect an animal feeder comprising a feed container having a filling aperture in a top portion thereof for filling with feed and having a feeding aperture in a lower portion thereof for allowing an animal to feed therefrom; means to pivotally mount said feed container in an animal barrier such that said feed container may pivot from a feeding position wherein said feeding aperture is positioned for said animal to feed from one side of said barrier and wherein said feeding aperture is in an upper position, to a filling position wherein said feeding aperture is positioned in a lower position for filling with feed from a second side of said barrier.

The feed container could conveniently pivot about a horizontal axis to accomplish the purpose of moving the feed aperture to a lower position for feeding.

The feeder of the invention may be mounted at the proper height for feeding the animal on the inside of the barrier. Normally such a mounting would mean that the filling aperture at the top of the feeder was quite high making it inconvenient to fill. The novel feeder however pivots down so that a person on the outside of the barrier may conveniently fill the feeder, and then pivot it back up to the feeding position.

To prevent the feed container from being moved by the animal, the feeder could comprise means to lock the feed container in the feeding position.

The feeder could further comprise a lid and means for mounting the lid on the barrier such that the lid covers the feeding aperture when the feed container is in the feeding position. The feeder could then be pivoted so that the feeding aperture moves away from under the lid for filling and then moves back under the lid in the feeding position. The means for mounting the lid could provide pivotal mounting such that the lid rests on the feed container when the feed container is in the feeding position and such that the lid moves downward when the feed container is moved to the filling position. This orientation could provide a better fit of the lid to the container.

The means to pivotally mount the feed container could also provide a cleaning position wherein the feed container is substantially inverted with the filling aperture below the feeding aperture whereby material in the feed container may fall out of the filling aperture on the second side of the barrier. For example the feed container in the filling position could be horizontal and in the cleaning position could move past horizontal so that the feed container is substantially inverted.

In a second aspect the invention provides an animal feeder for feeding an animal on the inside of a barrier and for filling with feed from the outside of said barrier, said feeder comprising a feed container having an open top and a feeding aperture in a bottom portion thereof; pivot hardware to pivotally mount said feed container in an opening in said barrier such that said feed container may be moved from a feeding position wherein said feeding aperture is positioned for said animal to feed therefrom on said inside of the barrier and wherein said open top is in an upper position, to a filling position wherein said open top is positioned in a lower position for filling with feed from said outside of the barrier.

The feeder requires that an opening be provided in the barrier with suitable framing so that the feed container may be mounted.

In a third aspect the invention provides an animal feeder panel adapted for installation in an opening in an animal barrier, said barrier having an inside on which an animal is confined, and an outside, said feeder panel comprising a frame adapted to be mounted in said opening in the barrier, said frame having an inside and an outside corresponding to said inside and outside of the barrier; and a feed container having an open top and a feeding aperture in a bottom portion thereof, wherein said feed container is pivotally mounted to said frame such that said feed container may be moved from a feeding position wherein said feeding aperture is positioned for said animal to feed therefrom on said inside of the barrier and wherein said open top is in an upper position, to a filling position wherein said open top is positioned in a lower position for filling with feed from said outside of the barrier.

It may be more convenient to provide such a frame with the feed container already mounted thereon for installation into an opening in a barrier, or the frame could be incorporated into a conventional panel for pens.

The open top could conveniently be oriented substantially vertically when the feed container is in the feeding position and substantially horizontally when in the filling position. There could be a first pivot member extending from one side of said feed container substantially in alignment with said barrier and a second pivot member extending from the opposite side of the feed container substantially in alignment with the barrier and the first pivot member. The pivot members could be located in a lower portion of the feed container, so that when it is pivoted down, the open top is quite low and accessible for filling. Any conventional pivot attachment could be used to achieve the desired results.

The feed container could mounted so as to rest against the barrier or frame when in the feeding position, and could also be latched to secure same from movement by an animal.

The feed container could comprise a front wall defining feeding aperture, and a back wall substantially in alignment with the barrier when the feed container is in the feeding position. The feed container would thereby extend out from the inside of the barrier or frame, and into the pen, leaving the aisle in a barn or similar area clear. Where the opposite was desired, the pen could be left clear and the feed container could extend out from the outside of the barrier or frame.

The front wall could comprise a grate sloping down and back from the top of the feed container and ending above the bottom of the feed container to provide the required feeding aperture.

The cleaning position could be achieved by moving the feed container past the filling position into an inverted position. A stop member could maintain the feed container in the filling position could be disengaged to allow the feed container to be moved to the inverted cleaning position. The stop member could conveniently be a chain or the like.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
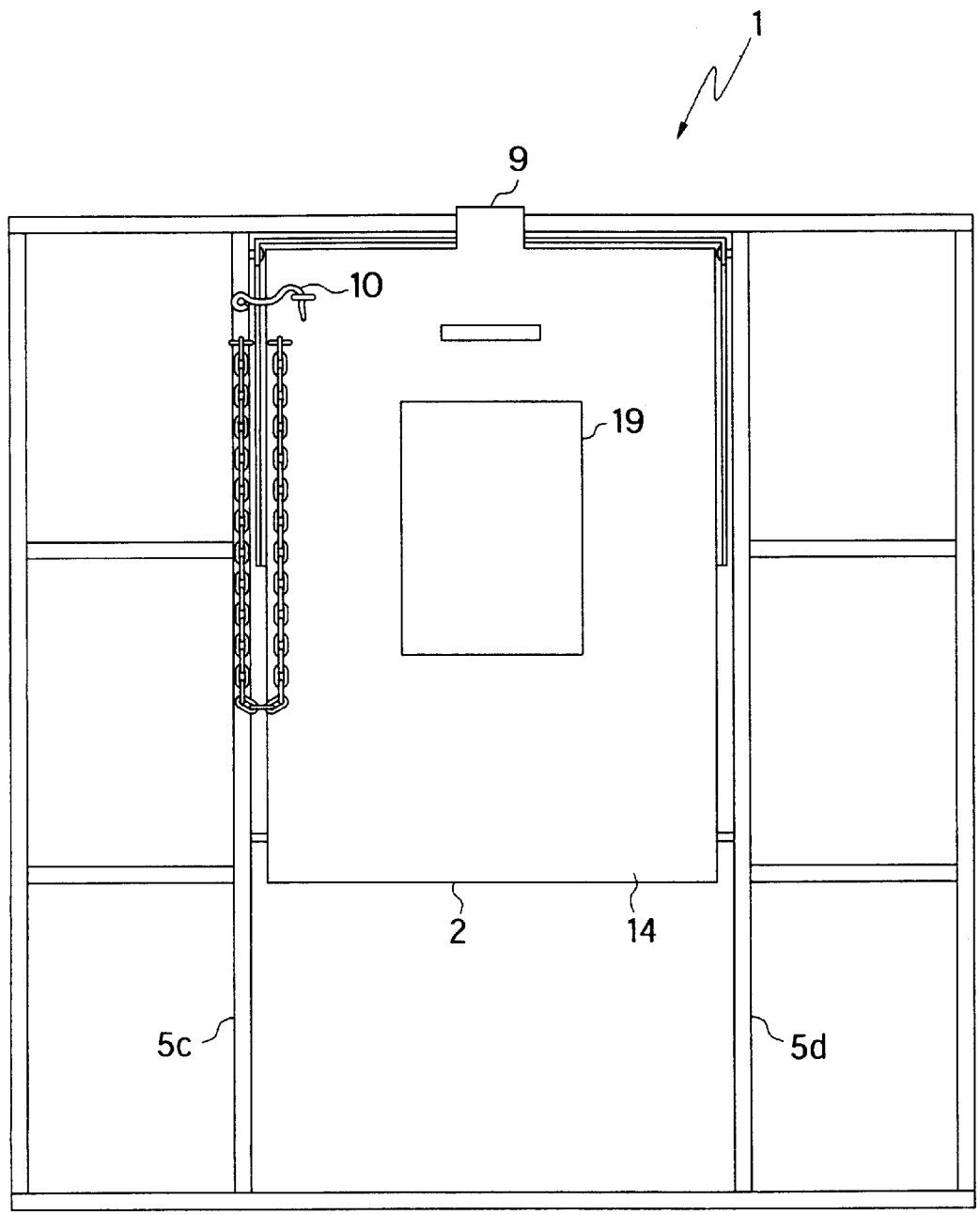
FIG. 1 is a rear view of an embodiment mounted in an animal pen panel, as seen from outside the pen.
Figure 2:
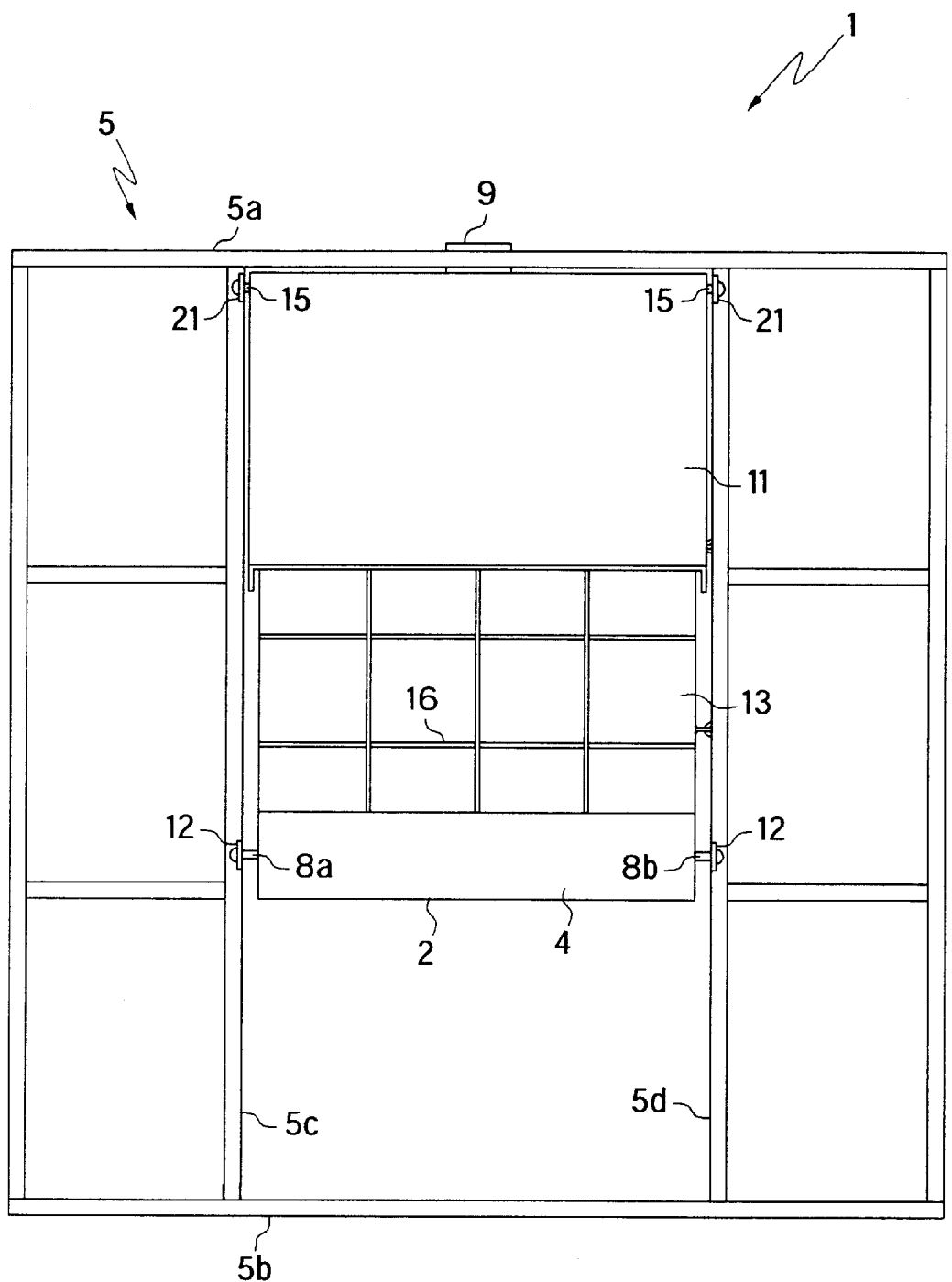
FIG. 2 is a front view of the embodiment of FIG. 1, as seen from inside the pen.

FIGS. 1–5 illustrate a feeder 1 of the invention comprising a feed container 2 having a filling aperture 3 in a top portion thereof for filling with feed. The filling aperture 3 is the open top of the feed container 2. The feed container 2 also has a feeding aperture 4 in a lower portion thereof for allowing an animal to feed therefrom. The feed container 2 is pivotally mounted in a frame being a pen panel 5, at the proper height to allow the animal being fed to comfortably feed therefrom. The pen panel 5 may be inserted in any animal barrier. The upper and lower panel rails 5a, 5b are joined by upright rails 5c, 5d which are spaced so as to accommodate the feed container 2 between them. The feed container 2 may be similarly mounted pivotally directly into an animal barrier such as a fence, stall or so forth.

Figure 3:
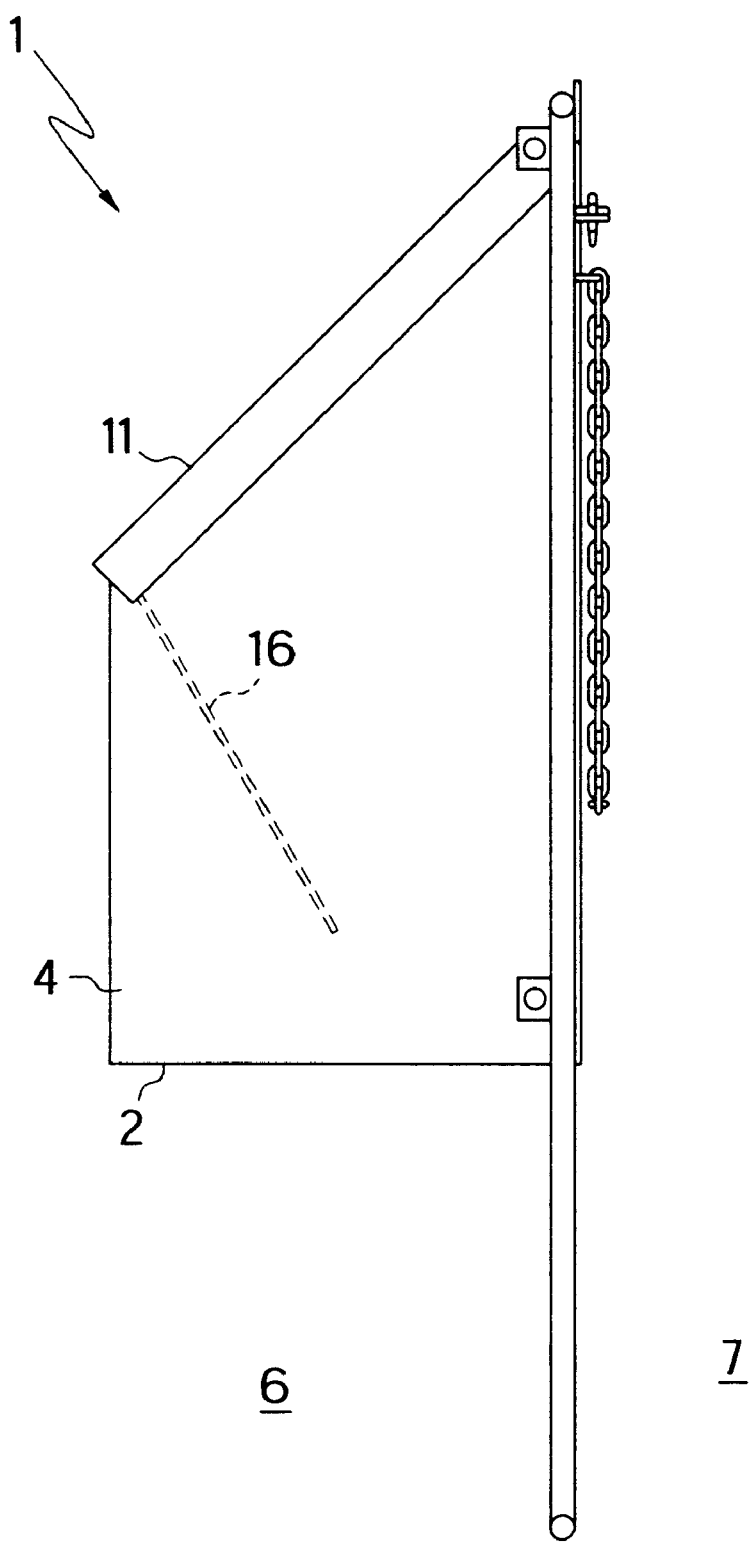
FIG. 3 is a side view of the embodiment of FIG. 1 showing the feed container in the vertical feeding position.
Figure 4:
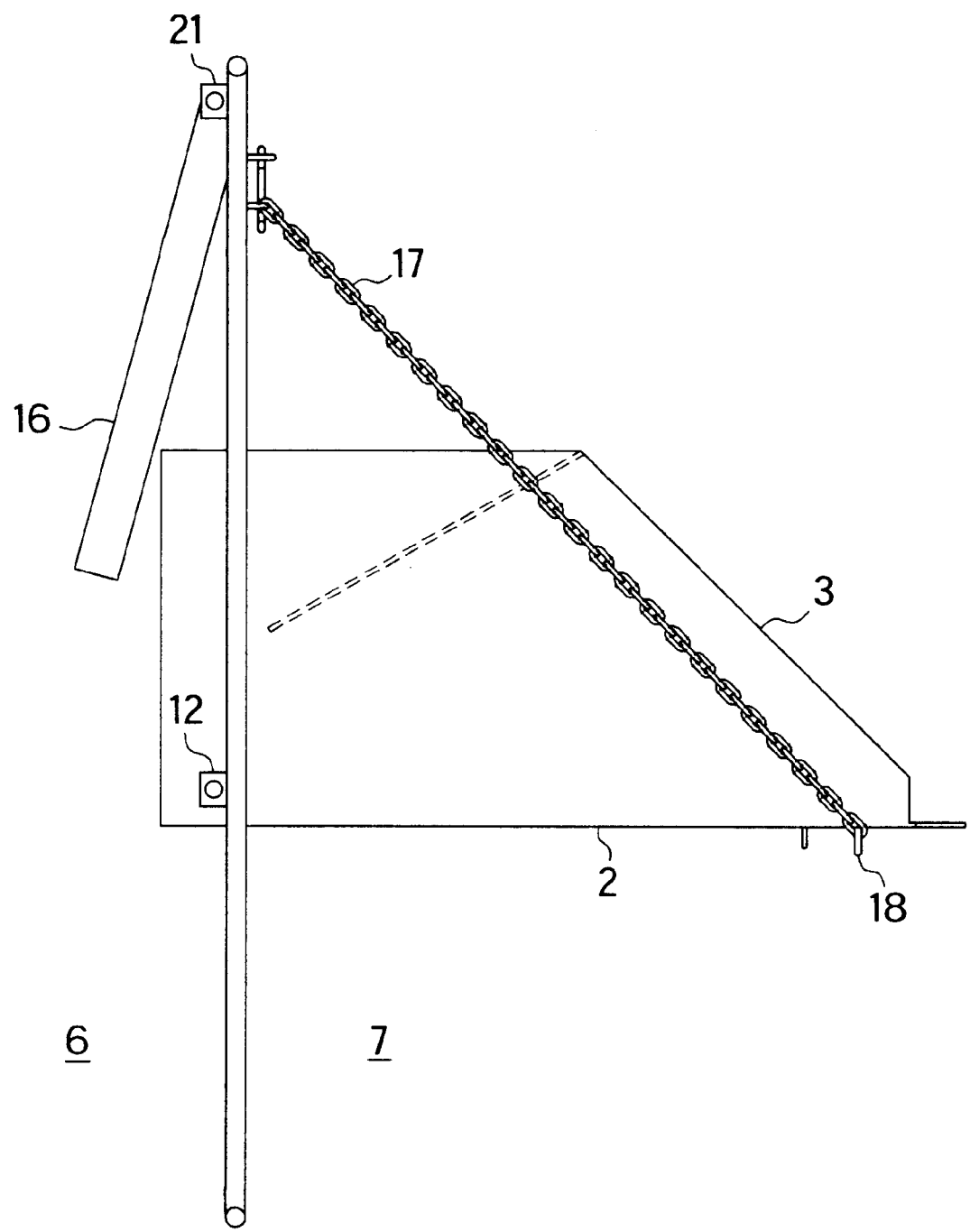
FIG. 4 is a side view of the embodiment of FIG. 1 showing the feed container in the horizontal filling position.
Figure 5:
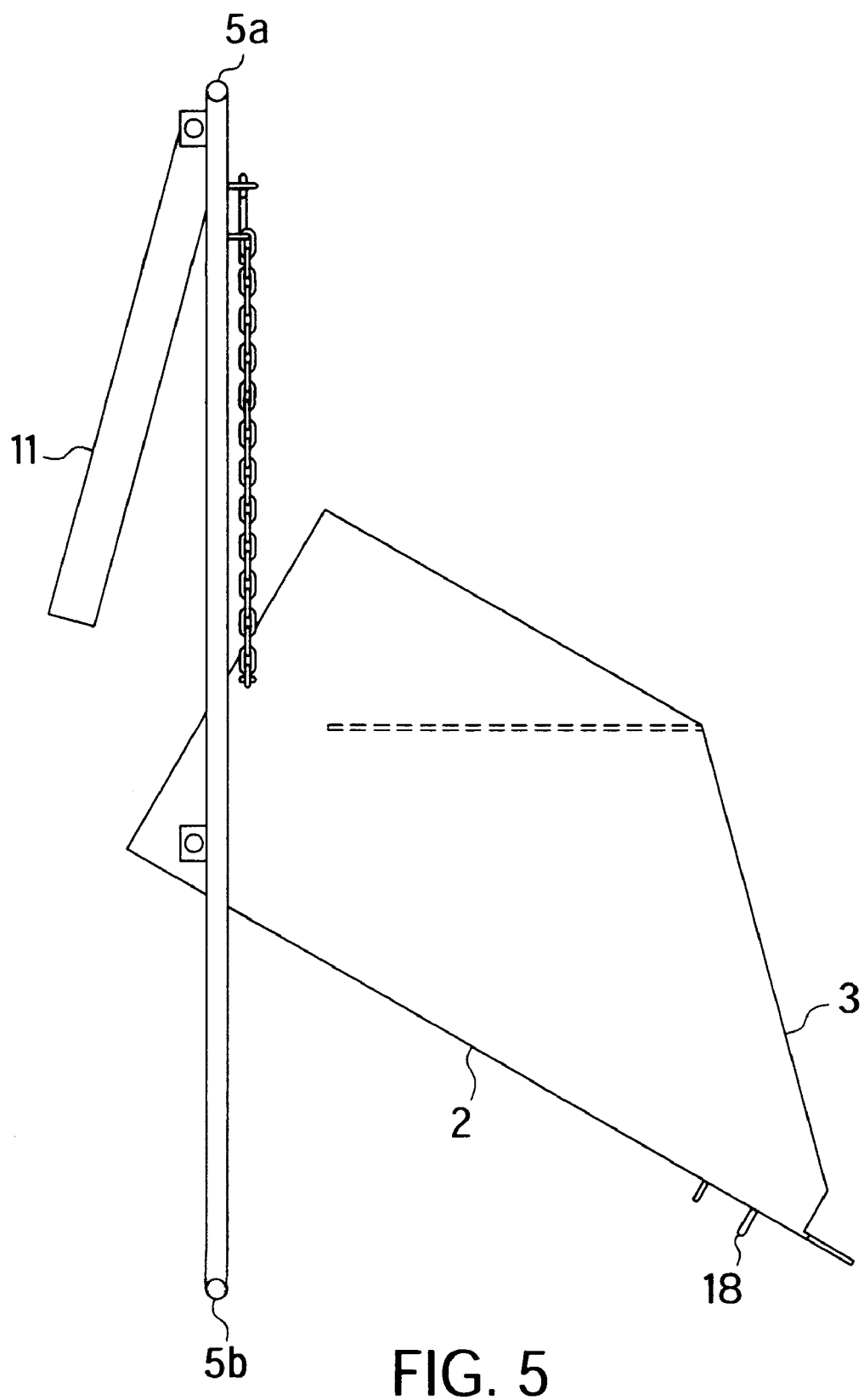
FIG. 5 is a side view of the embodiment of FIG. 1 showing the feed container in the substantially inverted cleaning position.

The feed container 1 is pivotally mounted in the panel 5 about a substantially horizontal axis such that it may be moved from a feeding position to a filling position. The feeding position is illustrated in FIG. 3, where the feeding aperture 4 is positioned for an animal to feed therefrom on the inside 6 of the panel 5 and where the filling aperture 3 is in an upper position, oriented vertically. The filling position is illustrated in FIG. 4 where the filling aperture 3 is positioned in a lower substantially horizontal position for filling with feed from the outside 7 of the panel 5.

The pivot hardware comprises a first pivot pin 8a extending from one side of the feed container 2 substantially horizontally in alignment with the panel 5 and a second pivot pin 8b extending from the opposite side of the feed container 2 substantially horizontally in alignment with the panel 5 and the first pivot pin 8a. The pivot pins 8a, 8b are engaged in pivot pin brackets 12. The first and second pivot pins 8a, 8b are located in a lower portion of the feed container 2 so that when pivoted down to the filling position, the filling aperture 3 moves down to a convenient height for filling with feed. Any suitable conventional pivot hardware could be used.

The feed container 2 is mounted so that flange 9, fixed to the top of the feed container 2, rest against the upper panel rail 5a when in the feeding position. A latch 10 is provided to lock the feed container 2 in the feeding position so that it is not tipped out by an animal in the pen.

A lid 11 is pivotally mounted on the upright rails 5c, 5d such that the lid 11 rests on and covers the feeding aperture 4 when the feed container 2 is in the feeding position. The pivot lid hardware comprises a shaft 15 fixed to the rear edge of the lid 11 and engaged in lid brackets 21 fixed to the upright rails 5c, 5d.

The lid 11 moves downward when the feed container 2 is moved to the filling position, as illustrated in FIG. 4. The lid 11 is thus automatically removed when the feed container 2 is moved to the filling position, and automatically covers the filling aperture 3 again when the feeding position is resumed. Alternatively the lid 11 could simply be placed in a fixed position by brackets or so forth attached to the panel 5 with the lid 11 positioned so as to cover the filling aperture 3 when in the feeding position, and remain fixed when the feed container 2 is moved to the filling position.

The feed container 2 comprises a front wall 13 defining the feeding aperture 4, and a back wall 14 which is substantially in alignment with the panel 5 when the feed container 2 is in the feeding position. The feed container 2 thereby extending out from said inside of the panel into the pen, keeping the outside, which could be the aisle of a barn, clear of obstructions. The feed container 2 could alternatively be mounted so that the inside is clear and the feed container 2 extends on the outside of the panel 5.

The back wall 14 provides a convenient mounting location for a message board 19, which is useful for leaving directions for care of the animal.

The front wall 13 comprises a grate 16 sloping down and back from the top of the feed container 2 and ending above the bottom of the feed container 2 to provide the feeding aperture 4. The grate 16 is suitable for hay, but could be solid for grain, pellets or so forth.

The feed container 2 is maintained in the filling position of FIG. 4 by a stop member, which in the illustrated embodiment is a chain 17. The feed container 2 may be moved to the cleaning position illustrated in FIG. 5 by un-hooking the chain 17 from the feed container bracket 18. In the cleaning position the filling aperture 3 is oriented substantially downwards and the feed container 2 is substantially inverted so material contained therein may fall out on the outside 7 of the panel 5.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. An animal feeder comprising:
   a feed container having a filling aperture in a top portion thereof for filling with feed and having a feeding aperture in a lower portion thereof for allowing an animal to feed therefrom;
   pivot means in a lower portion of said container pivotally mounting said feed container in an animal barrier such that said feed container may pivot from a feeding position, wherein said feeding aperture is positioned for said animal to feed from a first side of said barrier when said filling aperture is in an upper position, to a filling position wherein said filling aperture is positioned in a lower position on a second side of said barrier for filling with feed from said second side of said barrier.

2. The invention of claim 1 wherein said feed container pivots about a substantially horizontal axis.

3. The invention of claim 1 further comprising means to lock said feed container in said feeding position.

4. The invention of claim 1 further comprising a lid and means for mounting said lid on said barrier such that said lid covers said filling aperture when said feed container is in said feeding position.

5. The invention of claim 4 wherein said means for mounting said lid provides pivotal mounting such that said lid rests on said feed container when said feed container is in said feeding position and such that said lid moves downward when said feed container is moved to said filling position.

6. The invention of claim 1 wherein said means to pivotally mount said feed container further provides a cleaning position wherein said feed container is substantially inverted with said filling aperture below said feeding aperture whereby material in said feed container may fall out of said filling aperture on said second side of said barrier.

7. The invention of claim 6 wherein said feed container pivots about a substantially horizontal axis.

8. An animal feeder for feeding an animal on an inside of a barrier and for filling with feed from an outside of said barrier, said feeder comprising:
   a feed container having an open top and a feeding aperture in a bottom portion thereof;
   pivot hardware to pivotally mount said feed container in an opening in said barrier such that said feed container may be moved from a feeding position wherein said feeding aperture is positioned for said animal to feed therefrom on said inside of the barrier and wherein said open top is in an upper position, to a filling position wherein said open top is positioned in a lower position on said outside of the barrier for filling with feed from said outside of the barrier, said pivot hardware including pivot pins located in a lower portion of said container.

9. The invention of claim 8 wherein said feed container pivots about a substantially horizontal axis.

10. The invention of claim 9 wherein said feed container may be moved to a cleaning position wherein said open top is oriented substantially downwards whereby material contained in said feed container may fall out of said feed container on said outside of the barrier.

11. The invention of claim 8 wherein said open top is oriented substantially vertically when said feed container is in said feeding position and wherein said open top is oriented substantially horizontally when said feed container is in said filling position.

12. The invention of claim 11 further comprising a latch to lock said feed container in said feeding position.

13. The invention of claim 11 wherein said feed container is mounted so as to rest against said barrier when in said feeding position.

14. The invention of claim 11 wherein said feed container comprises a front wall defining said feeding aperture, and a back wall substantially in alignment with said barrier when said feed container is in said feeding position, said feed container thereby extending out from said inside of the frame.

15. The invention of claim 13 wherein said front wall comprises a grate sloping down and back from the top of said feed container and ending above the bottom of said feed container to provide said feeding aperture.

16. The invention of claim 8 wherein said pivot hardware comprises a first pivot member extending from one side of said feed container substantially horizontally in alignment with said barrier and a second pivot member extending from the opposite side of said feed container substantially horizontally in alignment with said barrier and said first pivot member.

17. The invention of claim 16 wherein said first and second pivot members are located in a lower portion of said feed container.

18. The invention of claim 8 further comprising a lid and lid hardware to attach said lid to said barrier such that said lid covers said open top when said feed container is in said feeding position and such that said open top is uncovered when said feed container is moved to said filling position.

19. The invention of claim 18 wherein said lid hardware comprises pivoting lid hardware to pivotally mount said lid such that said lid rests on said feed container when in said feeding position and such that said lid moves downwards when said feed container is moved to said filling position.

20. The invention of claim 18 wherein said feed container may be moved to a cleaning position wherein said open top is oriented substantially downwards whereby material contained in said feed container may fall out of said feed container on said outside of the barrier.

21. The invention of claim 20 further comprising a stop member and wherein said feed container is maintained in said filling position by said stop member and wherein said feed container is moved to said cleaning position by disengaging said stop member.

22. The invention of claim 21 wherein said stop member is a chain.

23. An animal feeder panel adapted for installation in an opening in an animal barrier, said barrier having an inside on which an animal is confined, and an outside, said feeder panel comprising:

a frame adapted to be mounted in said opening in the barrier, said frame having an inside and an outside corresponding to said inside and outside of the barrier; and, a feed container having an open top and a feeding aperture in a bottom portion thereof;

wherein said feed container is pivotally mounted at a lower portion of said container to said frame such that said feed container may be moved from a feeding position wherein said feeding aperture is positioned for said animal to feed therefrom on said inside of the barrier and wherein said open top is in an upper position, to a filling position wherein said open top is positioned in a lower position on said outside of the barrier for filling with feed from said outside of the barrier.

24. The invention of claim 23 wherein said feed container pivots about a substantially horizontal axis.

25. The invention of claim 24 wherein said open top is oriented substantially vertically when said feed container is in said feeding position and wherein said open top is oriented substantially horizontally when said feed container is in said filling position.

26. The invention of claim 25 further comprising a latch to lock said feed container in said feeding position.

27. The invention of claim 25 wherein said feed container comprises a front wall defining said feeding aperture, and a back wall substantially in alignment with said barrier when said feed container is in said feeding position, said feed container thereby extending out from said inside of the frame.

28. The invention of claim 27 further comprising a lid and lid hardware to attach said lid to said frame such that said lid covers said open top when said feed container is in said feeding position and such that said open top is uncovered when said feed container is moved to said filling position.

29. The invention of claim 28 wherein said lid hardware comprises pivoting lid hardware to pivotally mount said lid such that said lid rests on said feed container when in said feeding position and such that said lid moves downwards when said feed container is moved to said filling position.

30. The invention of claim 28 wherein said feed container may be moved to a cleaning position wherein said open top is oriented substantially downwards whereby material contained in said feed container may fall out of said feed container on said outside of the barrier.

31. The invention of claim 30 further comprising a stop member and wherein said feed container is maintained in said filling position by said stop member and wherein said feed container is moved to said cleaning position by disengaging said stop member.

* * * * *